(No Model.) 2 Sheets—Sheet 1.
O. W. SMITH.
CHEESE CUTTER.
No. 468,902. Patented Feb. 16, 1892.
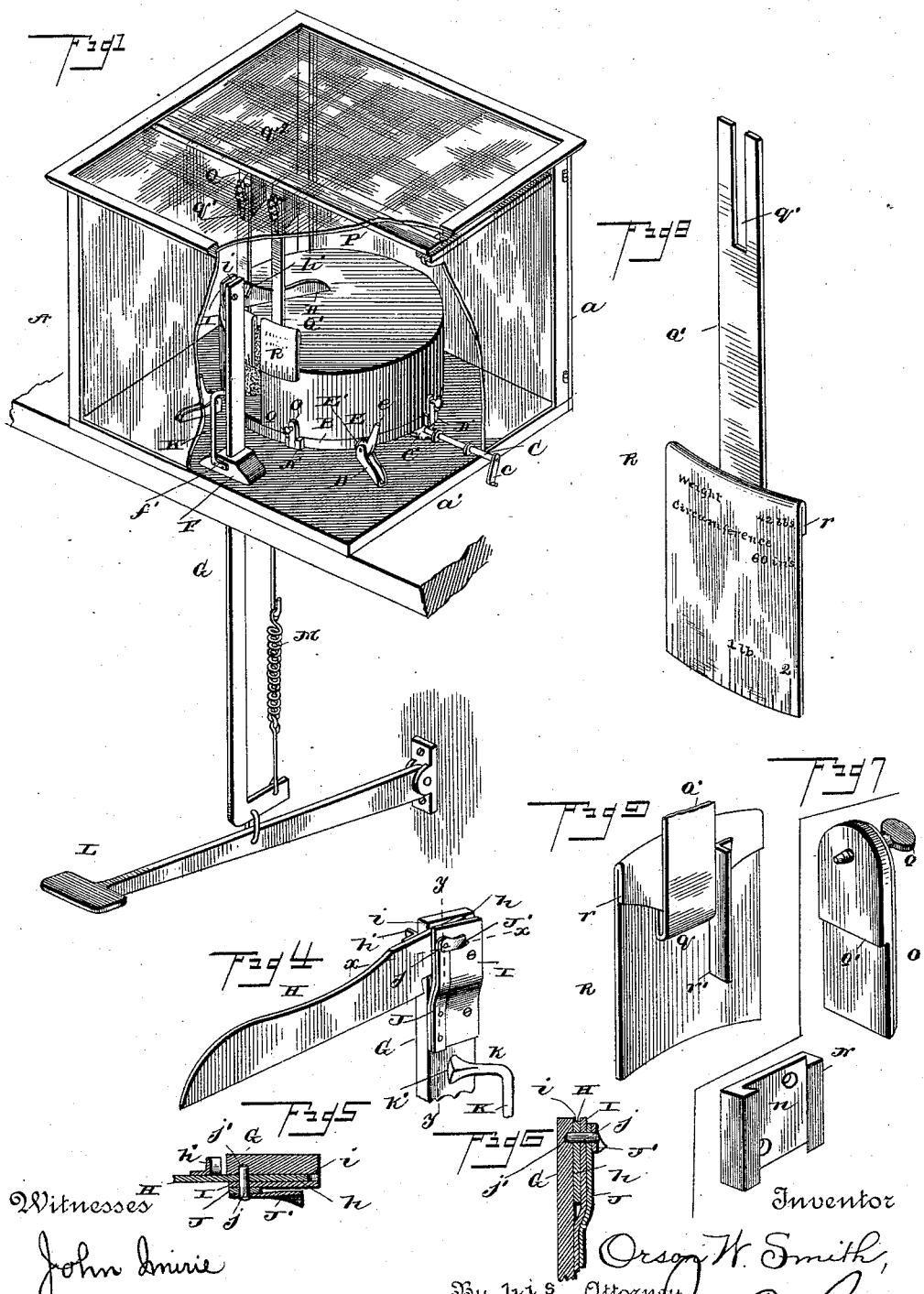
Witnesses
John Imrie
Ebn J. Littell
Inventor
Orson W. Smith
By his Attorney
J. R. Littell (No Model.) 2 Sheets—Sheet 2.
O. W. SMITH.
CHEESE CUTTER.
No. 468,902. Patented Feb. 16, 1892.
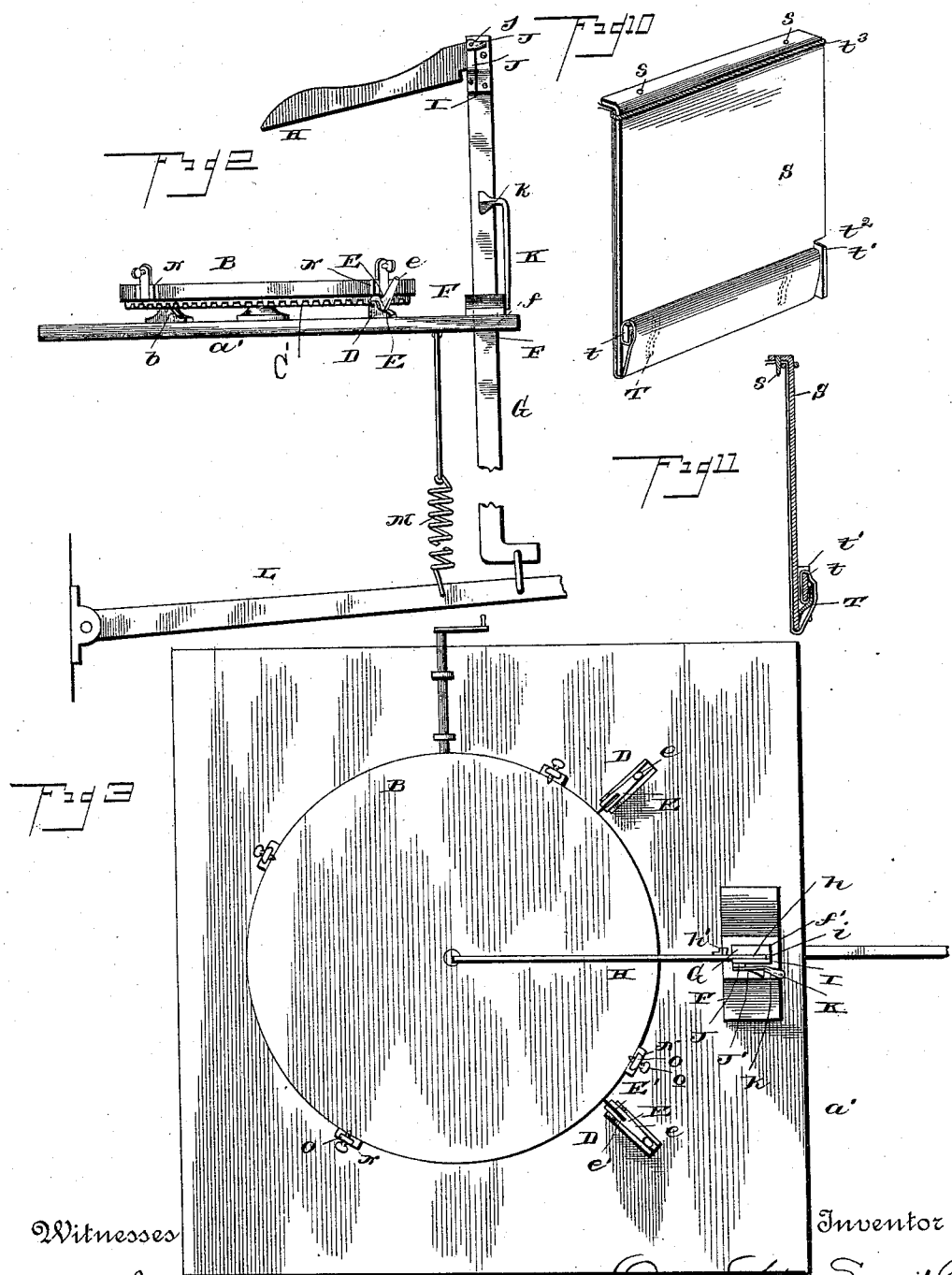

UNITED STATES PATENT OFFICE.

ORSON W. SMITH, OF CHARLEVOIX, MICHIGAN.

CHEESE-CUTTER.

SPECIFICATION forming part of Letters Patent No. 468,902, dated February 16, 1892.

Application filed December 10, 1890. Serial No. 374,253. (No model.)

*To all whom it may concern:*

Be it known that I, ORSON W. SMITH, a citizen of the United States, residing at Charlevoix, in the county of Charlevoix and State of Michigan, have invented certain new and useful Improvements in Cheese-Cutters; and I do hereby declare that the following is a full, clear, and exact description of the invention, which will enable others skilled in the art to which it appertains to make and use the same.

This invention relates to cheese-cutters of that class in which the knife is designed to be operated by foot-power; and it has for its object to provide a device of this character in which the knife is adapted to have an independent automatic movement, whereby the cheese is more readily and quickly cut.

A further object of the invention is to provide, in connection with a rotary cheese-board, a system of brakes for retaining the latter against further movement after it has been adjusted for cutting the cheese.

A further object of the invention is to provide, in connection with the cheese-cutter, simple and improved gages, by the employment of which a piece of cheese of any given weight may be readily cut.

In the drawings, Figure 1 is a perspective view of a cheese-cutter embodying my invention. Fig. 2 is a side elevation, the casing being removed. Fig. 3 is a top or plan view thereof. Fig. 4 is a detail perspective view of the knife, illustrating its connection with the guide-bar. Fig. 5 is a sectional view on the line $x\ x$, Fig. 4. Fig. 6 is a sectional view on the line $y\ y$, Fig. 4. Fig. 7 is a detail perspective view of one of the devices for securing the cheese upon the cheese-board. Fig. 8 is a detail perspective view illustrating the construction and manner of adjusting the gage-plates. Fig. 9 is a similar view showing the rear side of the gage-plate. Fig. 10 is a detail perspective view of the cheese-protector. Fig. 11 is a sectional view thereof.

Corresponding parts in the figures are denoted by the same letters of reference.

Referring to the drawings, A designates a rectangular casing provided at its front with a removable door $a$, through which the cheese may be inserted or removed. A horizontal shelf $a'$ is provided within the casing A, upon which is mounted a rotary cheese-board B, having a flat top surface and working upon rollers $b$, interposed between the board and the shelf $a'$ of the casing. To effect the rotation of the cheese-board, I prefer to employ a shaft C, projecting beyond the exterior of the casing and there provided with an operating crank-arm $c$. At the inner end of the shaft C is provided a pinion $c'$, which meshes with a circumferential rack-plate C′, secured to the bottom of the cheese-board. While I prefer to employ this mechanism for rotating the cheese-board, it is not essential to my invention, and any other suitable means may be employed in lieu thereof.

At either side of the cheese-board and near the front of the casing are disposed bifurcated standards D D, projecting upwardly from the shelf $a'$, to which they are secured. Within these standards are pivoted cam-levers E E, having outwardly-projecting operating-arms $e\ e$. The cam-faces of the levers E oppose the periphery of the cheese-board, and each of said faces is provided with a slot $e'\ e'$, within which is inserted a plate E′ E′, having its projecting portion or edge sharp and corresponding to the periphery of the cam-faces of the levers E. These plates are designed, when the operating-arms $e$ of the levers E are elevated, to engage the periphery of the cheese-board, binding the latter and arresting rotation in either direction.

Centrally, at the front edge of the shelf $a'$, is provided a rectangular slot $f$, extending through the same, and upon the top and bottom of said shelf are secured bearing-blocks F F, each of which being provided with a rectangular slot $f'\ f'$, corresponding to and coinciding with the slot $f$ and forming a continuation thereof. Within the continuous slot thus formed works a vertically-movable bar G, carrying at its upper end an inwardly-projecting knife H, projecting over the front half of the cheese-board. At the upper end of the bar G and at one side thereof is secured a plate I, corresponding in shape to said end, and from the secured lower end of this plate the same is bent outwardly and then inwardly parallel with the bar, forming an intervening slot $i$. The knife H is provided with a shank $h$, which is seated in the slot $i$ and pivotally secured to the plate and bar. A narrow spring-plate J, rigidly secured at its lower end, is disposed against the plate I at its inner vertical edge, and said plate J carries at its upper free end an inwardly-projecting pin or stud $j$, which is normally seated in perforations $j'$ in the plate I, knife, and bar. The pin or stud $j$, when in its normal position, serves to hold the knife at an incline to the horizontal, the knife, when in such position, being inclined downwardly toward its free inner end. Projecting rearwardly from the free upper end of the spring-plate J is an arm J′, at right angles to the plate, said arm having its free outer end bent at its lower edge so as to diverge from the plate I, the purpose of which will hereinafter appear.

K designates a trigger projecting vertically upward from the top bearing-block F, adjacent to the bar G at one side, and has its upper end portion $k$ turned inwardly at right angles thereto. The extreme end of the portion $k$ is flattened, its face opposing the bar G being parallel therewith, while the opposite face is beveled from the center toward its upper and lower edges, as shown at $k'$. The office of this trigger is to serve as a trigger to release the pin or stud $j$ from the knife and permit the latter to assume a horizontal position, movement beyond the latter being arrested by a stop $h'$, projecting from one side of the knife and adapted to bear against the inner edge of the bar G.

L designates a lever hinged at its inner end to the rear wall of the casing A and connected at about midway its length to the lower end of the bar G, the outer end of the lever being adapted to be depressed by the foot of the operator to cut the cheese. A spring M is disposed under the shelf $a'$ and connects the same with the bar G, the tension of the spring being exerted to return the bar G to its normal position after each stroke of the knife.

Upon the periphery of the cheese-board and at equidistant points are secured plates M, each provided in its outer face with a vertical dovetail groove $n$. An upright O is adapted to be removably secured in the groove of each plate and project above the cheese-board, and in the latter portion works a thumb-screw $o$, adapted to be adjusted against the cheese and secure the same rigidly upon the board. A shoulder $o'$ is formed at the rear face of each upright, forming a seat for the latter. In operation as the cheese is cut close to one of these devices the upright is removed, and thus interference with the cutting-knife is obviated.

At the top of the casing and within the same is a slide P, extending from side to side and adapted to be adjusted from front to rear of the casing. Depending from this slide at each side the center thereof is a block or plate Q. Secured to each of the latter is a downwardly-projecting vertical plate or strip Q′, having its lower end $q$ bent up and approximately parallel with the body of the plate. The upper end of the latter is provided with a longitudinal elongated slot $q'$, engaged by the set-screw $q^2$, working in its respective block Q and designed to permit of vertical adjustment of the plates Q′. R R designate two corresponding concavo-convex gage-plates formed with the turned-over upper ends $r\,r$, adapted to be hooked upon the lower hook ends of the plates Q′. A shoulder $r'$ is provided upon the rear of each gage-plate, designed to prevent displacement thereof when in position. In practice a series of pairs of gage-plates are provided, each pair being marked with a given weight and circumference of cheese, and also a scale denoting the size of pieces to be cut from the cheese to weigh the desired amount.

It will of course be understood that the weight and circumference of the cheese is ascertained prior to placing the same within the cabinet. The pair of gage-plates corresponding thereto is attached to the strips or plates Q′ and the slide P adjusted to bring the gage-plates close to the periphery of the cheese and in position for use.

For preventing the cheese from drying I provide one or more protectors S, formed of sheet metal and each having its upper edge bent over at right angles thereto. From the inner face of this bent portion project points or spurs $s$. Upon the rear or outer side of the plate and near its lower edge are provided two approximately right-angular clamps T T, adapted to receive and retain a strip $t$. At the inner edge of the plate and at the lower end thereof is formed an outturned portion $t'$, leaving a projecting edge $t^2$ extending nearly the entire length of the plate. Over the face of the plate is adapted to be secured oiled paper, and in securing the same it is first wrapped around the strip $t$, when the latter is inserted under the clamps. The paper is then carried around over the face of the protector and secured at its free end by a string $t^3$. The office of the protector will be apparent. After a piece of cheese is cut from the cheese the face of the protector is placed against the exposed surface of the latter and pressed down in position with the points or spurs secured in the top of the cheese, thus effectually excluding air from the exposed surface and thereby preventing drying of the cheese.

The operation and advantages of my invention will be readily understood by those skilled in the art to which it appertains.

The knife is normally elevated above the cheese and locked at an incline to the horizontal by the pin or stud $j$. To cut the cheese the cheese-board is turned to the desired point and locked in such position by either or both of the brake-levers E. By depressing the foot-lever the knife is caused to descend, the pointed inner end entering the cheese at the center, and the knife passes through the cheese at an angle, thus reducing the resistance to the knife. When the lower inner end of the knife has about passed entirely through the cheese, the beveled inwardly-projecting end of the trigger K engages the inner face of the arm J' of the spring-plate J, forcing the latter from the plate I and releasing the pin or stud $j$ from the knife. The latter being now free, it assumes a horizontal plane and in its further descent cuts the outer lower portion of the cheese, thus completely severing the latter through one-half of its diameter. After the cheese has been cut the foot-lever is released and the spring M returns the knife to its normal or elevated position. In the upward passage of the knife the friction of the cheese against the sides of the same serves to return it to its original inclined position, when the pin or stud $j$ also returns to its normal position, locking the knife against independent movement. It will thus be obvious that the entire operation of the knife is automatic and requires no preliminary or after adjustment.

I claim as my invention—

1. In a cheese-cutter, the combination, with a cheese-board, of a vertically-moving bar, a knife pivoted at the upper end of the latter, a spring-plate carrying a pin or stud adapted to normally engage a perforation in the knife to retain the latter at an incline to the cheese-board, and a trigger for automatically releasing said pin or stud from the knife during the operation of cutting to permit the same to assume a plane corresponding to that of the cheese-board, substantially as and for the purpose set forth.

2. In a cheese-cutter, the combination, with a rotatable cheese-board, of a vertically-moving bar located near the periphery thereof, a knife pivoted at the upper end of said bar, a spring-plate carrying an inwardly-projecting pin or stud adapted to normally engage coincident perforations in the knife and bar to retain the former at an angle to the cheese-board, said spring-plate being provided with an outwardly-projecting arm diverging at its lower edge from the bar, and a standard projecting vertically upward adjacent to said bar and having an inturned upper end beveled toward the bar and adapted to engage the inner face of the divergent arm of the spring-plate during descent of the knife to release the pin or stud from the latter, substantially as and for the purpose set forth.

3. In a cheese-cutter, the combination, with a rotatable cheese-board, of plates secured at the periphery thereof and provided each with a vertically-disposed dovetail groove, detachable uprights having their lower ends corresponding to and seated in said grooves, and set-screws carried by said uprights and adapted to be adjusted to retain the cheese in position, substantially for the purpose set forth.

4. In a cheese-cutter, the combination, with a rotatable cheese-board, of a slide disposed above the cheese-board, vertically-adjustable strips secured to and depending from said slides, and gage-plates adapted to be removably secured to the ends of the strips, substantially as set forth.

5. A cheese-protector comprising a plate having its top edge bent over and provided with downwardly-projecting points or spurs, an inturned flange formed at the lower end of the inner vertical edge of the plate and projecting in the opposite direction to that of the bent top edge for the purpose described, clasps secured to the outer face of the plate, and a strip adapted to be held by said clasps, substantially as and for the purpose set forth.

In testimony whereof I affix my signature in presence of two witnesses.

ORSON W. SMITH.

Witnesses:
G. A. SHERWOOD,
WM. J. LITTELL.